US006558254B2

(12) United States Patent
Baelocher et al.

(10) Patent No.: US 6,558,254 B2
(45) Date of Patent: *May 6, 2003

(54) GAMING DEVICE WITH SIGNIFIED SYMBOLS

(75) Inventors: Anthony J. Baelocher, Reno, NV (US); Cari L. Blomquist, Reno, NV (US); Lance L. Peterson, Reno, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/990,484

(22) Filed: Nov. 16, 2001

(65) Prior Publication Data

US 2002/0032050 A1 Mar. 14, 2002

Related U.S. Application Data

(63) Continuation of application No. 09/605,344, filed on Jun. 28, 2000, now Pat. No. 6,319,124.

(51) Int. Cl.[7] ........................... A63F 9/24; A63F 13/00; A63F 1/00

(52) U.S. Cl. ......................... 463/20; 463/16; 273/138.1

(58) Field of Search ................................ 463/1, 16–18, 463/20, 30–32, 37, 40, 42–43, 31; 273/138.1, 139, 142 R, 143 R, 143 A, 142 B, 138.2, 459–460

(56) References Cited

U.S. PATENT DOCUMENTS

| | | | |
|---|---|---|---|
| 4,695,053 A | 9/1987 | Vazquez, Jr. et al. | |
| 5,766,074 A | 6/1998 | Cannon et al. | |
| 6,089,976 A | 7/2000 | Schneider et al. | |
| 6,126,165 A | 10/2000 | Sakamoto | |
| 6,186,894 B1 | 2/2001 | Mayeroff | |
| 6,224,483 B1 | 5/2001 | Mayeroff | |
| 6,231,442 B1 | 5/2001 | Mayeroff | |
| 6,231,445 B1 | 5/2001 | Acres | |
| 6,254,481 B1 | 7/2001 | Jaffe | |
| 6,270,411 B1 | 8/2001 | Gura et al. | |
| 6,311,976 B1 * | 11/2001 | Yoseloff et al. | 273/138.2 |
| 6,319,124 B1 * | 11/2001 | Baerlocher et al. | 462/20 |

* cited by examiner

*Primary Examiner*—Kim Nguyen
(74) *Attorney, Agent, or Firm*—Bell, Boyd & Lloyd LLC

(57) ABSTRACT

The present invention relates to a game for a gaming device which involves signifying symbols for a variety of purposes, such as highlighting game events, winning symbols, losing symbols and selections which a player can make. The gaming device signifies the symbols by applying enhancements to certain symbols or their backgrounds, such as coloration or shading. This type of game increases player involvement, entertainment and excitement.

31 Claims, 7 Drawing Sheets

GAMING DEVICE WITH SIGNIFIED SYMBOLS

PRIORITY CLAIM

This application is a continuation of and claims priority to U.S. patent application, Ser. No. 09/605,344, filed Jun. 28, 2000 entitled "GAMING DEVICE WITH SIGNIFIED REEL SYMBOLS.", now U.S. Pat. No. 6,319,124.

CROSS-REFERENCE TO RELATED APPLICATIONS

This application is related to the following commonly-owned co-pending patent applications: "GAMING DEVICE WITH TRAVELING REEL SYMBOLS," Ser. No. 09/606,928; "GAMING DEVICE WITH TRAVELING REEL SYMBOLS," Ser. No. 09/689,197; "GAMING DEVICE AND METHOD FOR ENHANCING THE ISSUANCE OR TRANSFER OF AN AWARD," Ser. No. 09/583,482; "GAMING DEVICE DISPLAYING AN EXHIBITION FOR REPLACING VIDEO REELS," Ser. No. 09/606,733, now U.S. Pat. No. 6,375,570; "GAMING DEVICE WITH MOVING SCREEN SIMULATION," Ser. No. 09/625,884; "GAMING DEVICE WITH SIGNIFIED REEL SYMBOLS," Ser. No. 09/605,344 now U.S. Pat. No. 6,319,124; "GAMING DEVICE HAVING TOUCH ACTIVATED ALTERNATING OR CHANGING SYMBOL," Ser. No. 09/602,331; "GAMING DEVICE HAVING A CHANGEABLE OBJECT," Ser. No. 09/680,111; "GAMING DEVICE HAVING INTERACTING SYMBOLS," Ser. No. 09/686,308; "GAMING DEVICE HAVING CHANGED OR GENERATED PLAYER STIMULI," Ser. No. 09/686,244; and "GAMING DEVICE HAVING A SYMBOL COVERING FEATURE," Ser. No. 09/684,275.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which signifies certain symbols for one or more purposes.

BACKGROUND OF THE INVENTION

In current gaming machines such as slot machines, players are able to receive various awards associated with various events. Sometimes the games directly involve the slot machine reels which are often in video form. Each reel typically includes several symbols. Existing gaming machines use the symbols in a variety of ways. For example, existing gaming machines include winning symbols and winning symbol combinations as well as losing symbols and symbol combinations. The symbols generally determine the awards.

To increase player enjoyment and excitement, it is desirable to provide players with new techniques for emphasizing game events and directing a player's attention to the presence and purpose of certain symbols on certain reels using alternative methods.

It is often desirable to emphasize or signify certain symbols during a game, especially after the occurrence of a winning event or a game event such as a winning combination of symbols. One known technique is to signify certain winning symbols by visually enhancing or highlighting the symbols which are part of a winning combination. However, existing gaming machines do not signify certain winning combinations of symbols by means of visually altering the losing symbols alone. Furthermore, existing gaming devices do not include bonus schemes where a player can choose certain reel symbols which are visually signified as selectable.

To increase player enjoyment and excitement, it is desirable to provide players with new techniques for emphasizing game events and directing a player's attention to the presence and purpose of certain symbols on certain reels using alternative methods.

SUMMARY OF THE INVENTION

The present invention overcomes the above shortcomings by providing a gaming device and method which directly involves a plurality of reels, preferably video reels. The reels are adjacent to one another, and each reel exhibits a plurality of indicia or symbols. During the primary game of the gaming device, functionally each reel spins, comes to a stop and exhibits symbols. The term exhibit, as used herein, generally includes displaying, performing or otherwise representing a person, place or thing visually and/or audibly.

Various symbols have various functions in the game. Some symbols, when they appear, determine whether a player gains value, loses value or neither gains nor loses value. Other symbols may serve as selections which a player must choose. Based upon a predetermined program, the gaming device signifies various symbols, generally to draw the player's attention to these symbols or to other symbols. When signifying a symbol, the computer of the gaming device applies an enhancement to the symbol. The term enhancement, as used herein, includes, but is not limited to, shading, coloration, bordering, illumination, marks, patterns (i.e., pinstripes) or other visual embellishments which distinguish certain symbols or symbol backgrounds from other symbols or symbol backgrounds.

In one embodiment, before a player begins the primary game, the reels are stationary, and they exhibit a predetermined number of symbols. After the reels spin and come to a stop, certain predetermined symbols (hereafter referred to as "winning symbols") may appear on certain reels, individually or in combination with other symbols. The appearance of one or more winning symbols in one or more positions constitutes a winning event which causes the game to award the player with a value. For example, a winning event could be a winning symbol appearing anywhere on any reel or it could be the same winning symbol appearing on three identical locations on three adjacent reels. The non-winning symbols (hereinafter referred to as "losing symbols") are the symbols displayed on the reels which are not the winning symbols. The term symbol, as used in this specification, includes but is not limited to any audio, visual or audio-visual representation of a person, place or thing, such as characters, letter, numbers, drawings, pictures or other indicia.

Preferably, the computer of the gaming devices signifies the winning symbols in a primary game. Here, the symbols are located on a background. Initially, all of the backgrounds for all of the symbols are identical. When a winning event occurs, the computer uses an enhancement to change the appearance of the losing symbols. In this manner, the computer signifies the winning symbols.

Depending upon the design of the game, initially all of the symbol backgrounds can be the same color, preferably white. When a winning event occurs, the computer colors, shades or darkens the backgrounds of the losing symbols. Therefore, after a winning event occurs, the winning symbols have a background with one color and the losing symbols have a distinguished, preferably darker background. If the player has remaining credits, the game enables the player to spin the reels again, and this process repeats itself. If the player has no remaining credits, the game terminates.

Another embodiment of the present invention may be employed in a bonus scheme, where one or more of the reels includes at least one symbol which the player can select and by doing so, receive a bonus value (hereinafter referred to as a "selection" or a "selectable symbol"). The computer of the gaming device signifies the selections in order to distinguish them from the other symbols by applying enhancements to the background where: (a) the selection is located; (b) the other symbols or non-selectable symbols are located; or (c) both the selections and other symbols are located.

The player can choose one or more of the signified selections. Preferably, after choosing a selection, the selection and/or other symbols animate. The term animate, as used herein, includes but is not limited to move, simulate movement, vibrate or shake, rotate, flip over, move upwards, downwards, or from side to side, bend, transform into a different shape or size, separate into different parts, expand or contract, change colors, shades or patterns, illuminate, make sounds or otherwise having dynamic characteristics. Next, the game awards the player with a bonus value which corresponds to the chosen selection. Finally, the bonus round terminates.

In an alternative embodiment of this bonus scheme of the present invention, the gaming device includes a plurality of and preferably five video reels. Each reel, when not spinning, exhibits three symbols on a white background. The symbols include a plurality of characters and other items. Each reel includes one selection, and each selection is a character. The computer of the gaming device signifies the selections by shading or coloring gray the background of the other symbols. As such, the selections have a white background and the other symbols have a darker background.

In the preferred embodiment, when the player chooses a signified selection, the chosen character animates. The character makes predetermined movements, such as dance movements and the game provides accompanying sounds. Next, the game provides the player with a bonus value which corresponds the chosen selection. The bonus round then terminates.

The gaming device of the present invention signifies certain reel symbols using enhancements in order to draw attention to the symbols. In a primary game, the winning symbols are signified by applying an enhancement to the background of the losing symbols and not changing the winning symbols. In a bonus scheme, the present invention provides certain symbols on the gaming device reels which the player can select. The computer signifies these selections by applying certain enhancements to the background of the selections and/or other symbols. Once the player chooses a selection, the game provides the player with a corresponding bonus value. Preferably, after the player chooses a selection, certain selections and/or symbols animate for player entertainment.

It is therefore an object of the present invention to provide a gaming device with reels which signify certain symbols for multiple purposes.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
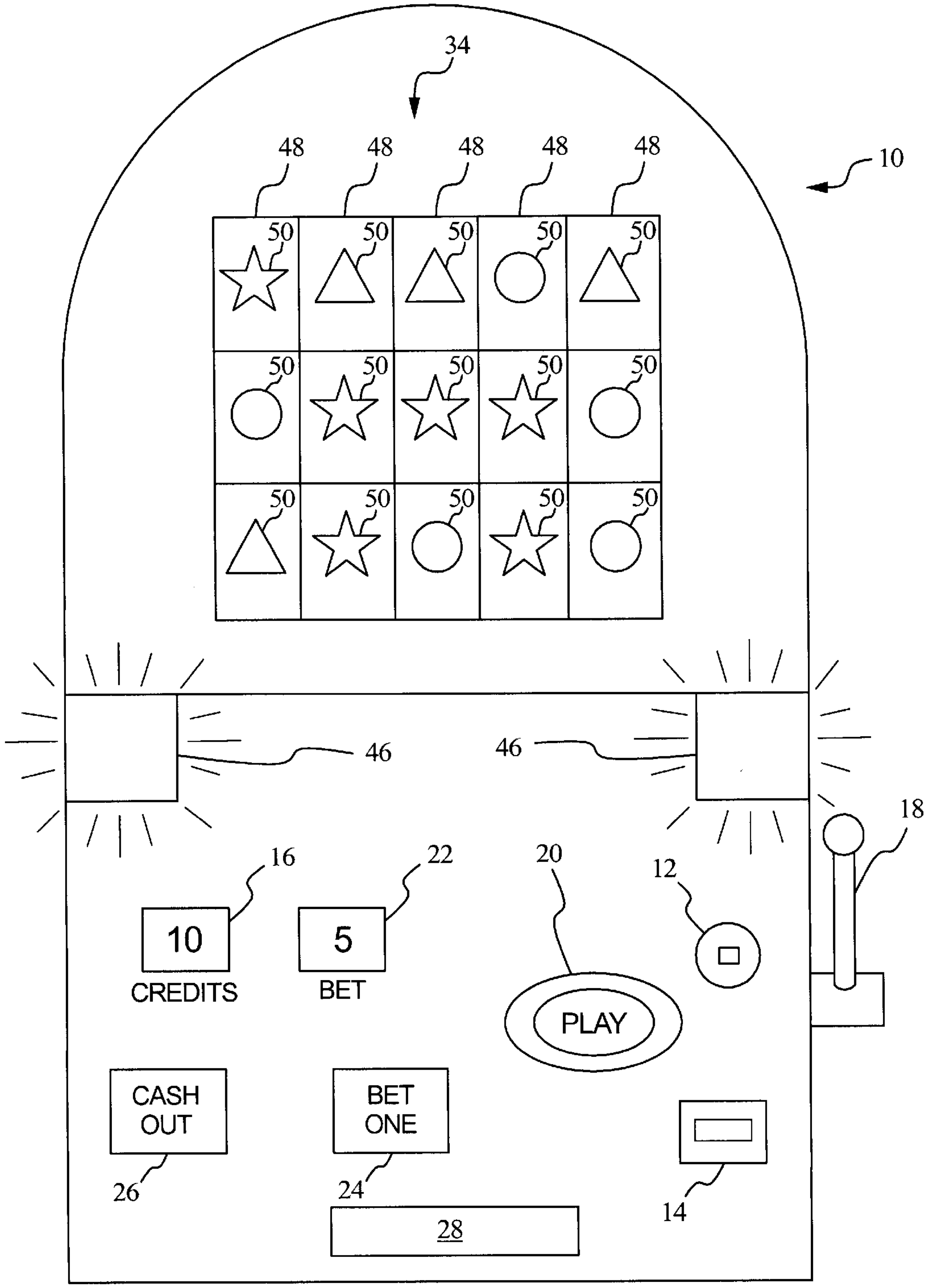
FIG. 1 is a front plan view of one embodiment of the gaming device of the present invention.

Referring now to the drawings, FIG. 1 generally illustrates a gaming device 10 of one embodiment of the present invention, which is preferably a slot machine having the controls, displays and features of conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any triggering combination. The indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Figure 2:
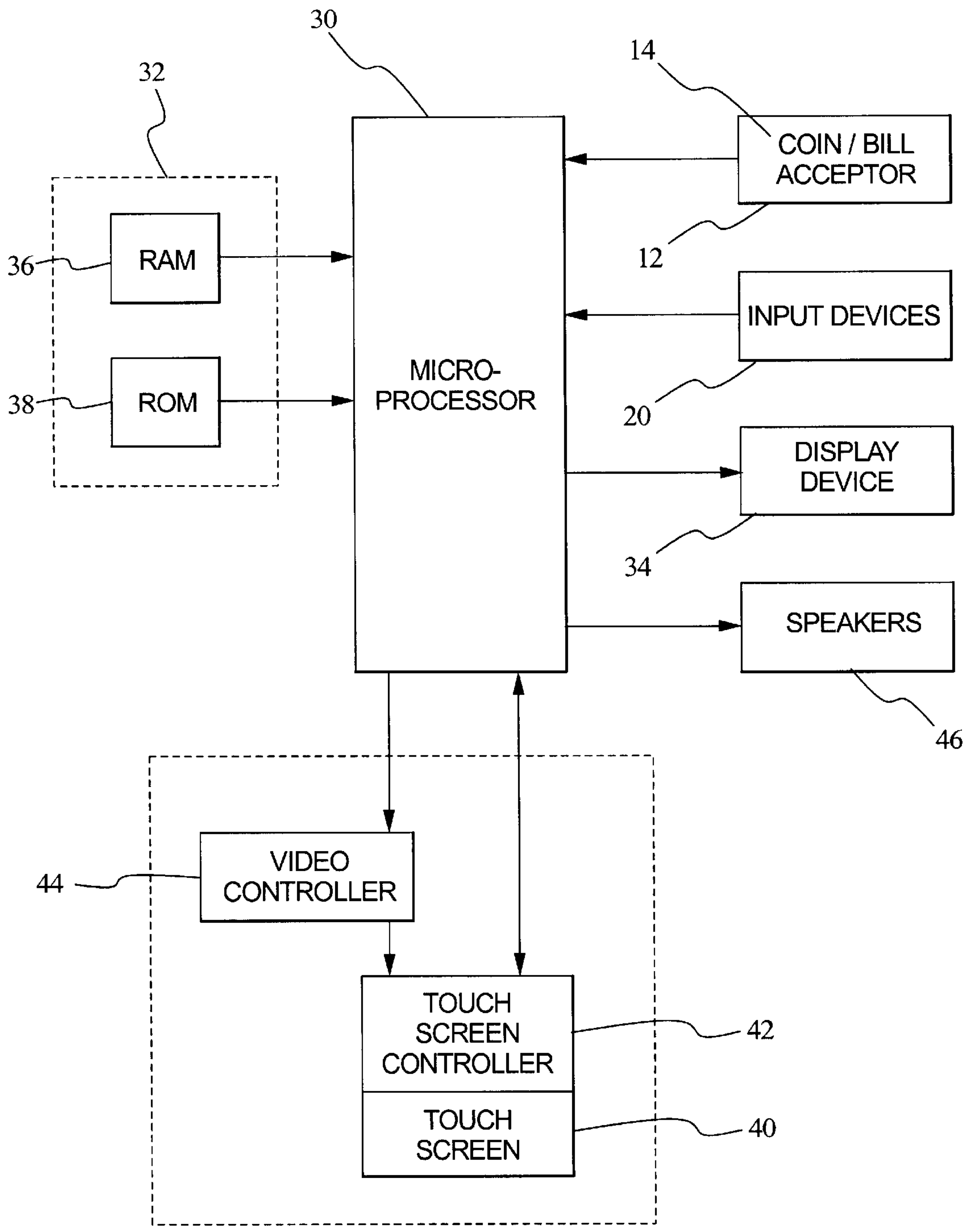
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 30, a memory device 32 for storing program code or other data, a video monitor or other display device 34 (i.e., a liquid crystal display) and at least one input device such as play buttons 20. The processor 30 is preferably a microprocessor or microcontroller-based platform which is capable of displaying and exhibiting images, symbols and other indicia such as images of people, characters, places, things and faces of cards. The memory device 32 can include random access memory (RAM) 36 for storing event data or other data generated or used during a particular game. The memory device 32 can also include read only memory (ROM) 38 for storing program code which controls the gaming device 10 so that it plays a particular game in accordance with applicable game rules and pay tables.

As illustrated in FIG. 2, the player preferably uses play buttons 20 to input signals into gaming device 10. Furthermore, it is preferable that touch screen 40 and an associated touch screen controller 42 are used instead of a conventional video display device 34. Touch screen 40 and touch screen controller 42 are connected to a video controller 44 and processor 30. A player can make decisions and input signals into the gaming device 10 by touching touch screen 40 at the appropriate places. As further illustrated in FIG. 2, the processor 30 can be connected to coin slot 12 or bill acceptor 14. The processor 30 can be programmed to require a player to deposit a certain amount of money in order to start the game. Furthermore, gaming device 10 preferably includes speakers 46 for making sounds or playing music consistent with the theme of the game and bonus scheme.

It should be appreciated that although a processor 30 and memory device 32 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 30 and memory device 32 preferably reside on each gaming device 10 unit, it is possible to provide some or all of their functions at a central location such as a network server for communication to a playing station such as over a local area network (LAN), wide area network (WAN), Internet connection, microwave link, and the like. The processor 30 and memory device 32 are generally referred to herein as the "computer."

Symbol Signification Techniques

With reference to FIGS. 1 and 2, display device 34 contains a plurality of reels 48, preferably five reels in mechanical, video or virtual form. Preferably, reels 48 are in video or virtual form. Each reel 48 exhibits a plurality of symbols 50 such as letters, characters, bells, hearts, fruits, numbers, bars or other images or indicia which preferably correspond to a theme associated with the gaming device 10.

In primary games and in bonus schemes, the computer signifies certain symbols 50 for various predetermined purposes. Such purposes can includes drawing attention to a gain in value, loss in value, winning symbols or combinations thereof, losing symbols, a player's options or choices or other game events. The computer signifies symbols 50 by applying predetermined enhancements to certain symbols 50 or the backgrounds of certain symbols 50.

Figure 3:
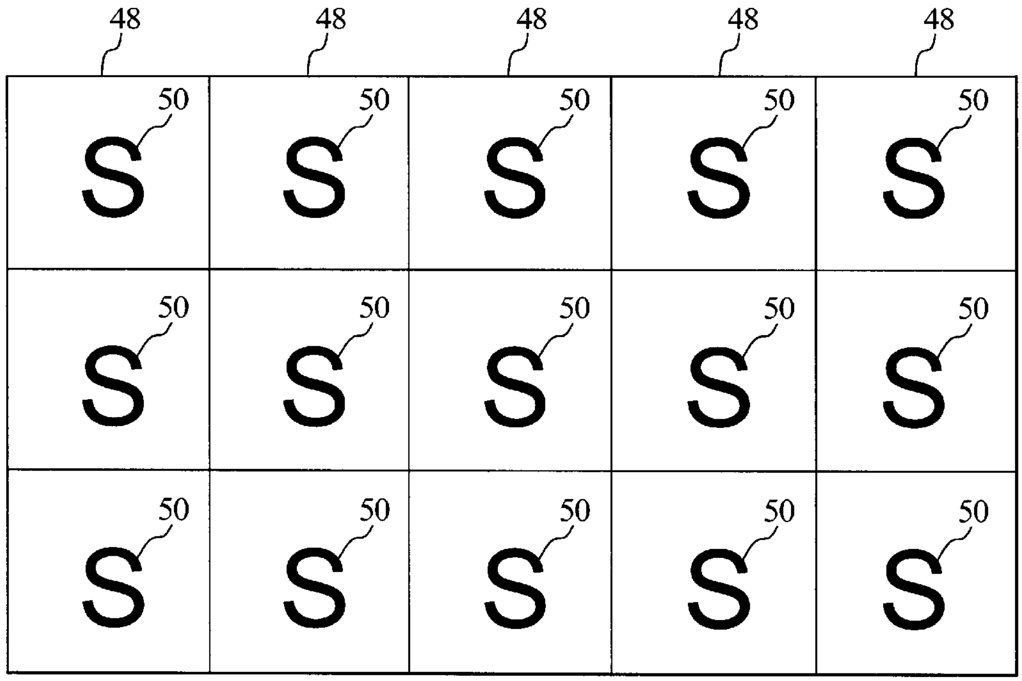
FIG. 3 is a top plan view of the reels and symbols in one embodiment of the present invention.

In one embodiment, the computer signifies winning symbols 50. Before a player begins the primary game, the backgrounds of all of the symbols 50 are identical and preferably colored white, as shown in FIG. 3. Symbols 50 are represented by the letter "S." When the player initiates a spin, the reels 48 rotate and eventually come to a stop. Depending upon where the reels 48 stop, the computer may or may not exhibit one or more winning symbols 50. If the reels 48 do not exhibit at least one winning symbol 50, the game enables the player to spin the reels 48 again until the player achieves a winning event or runs out of credits.

Figure 4:
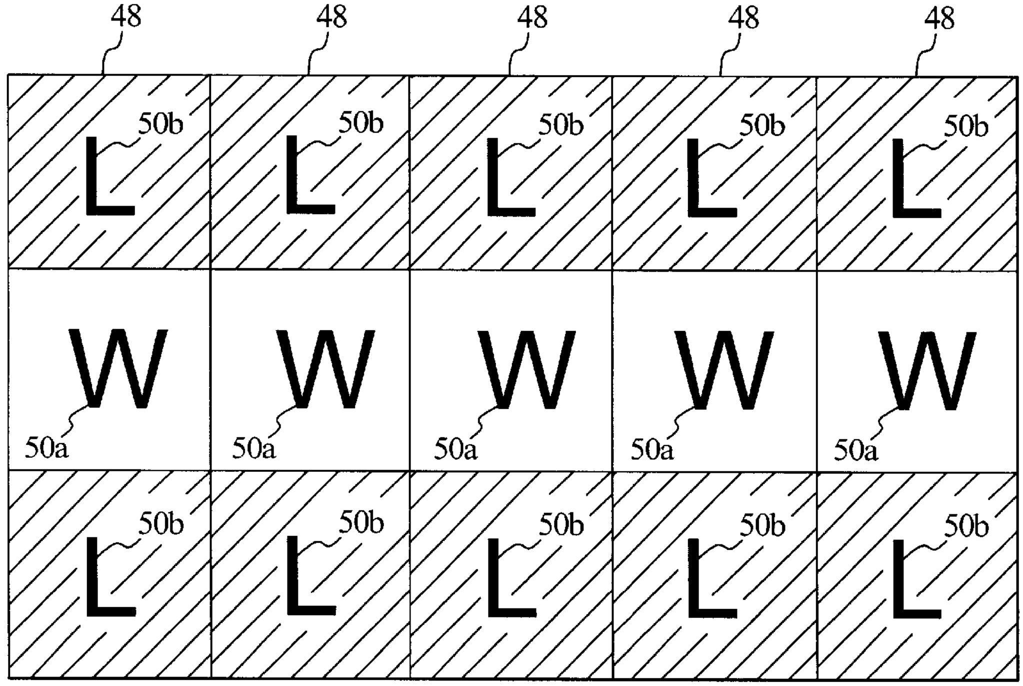
FIG. 4 is a top plan view of the reels, winning symbols and losing symbols in one embodiment of the present invention.
Figure 5:
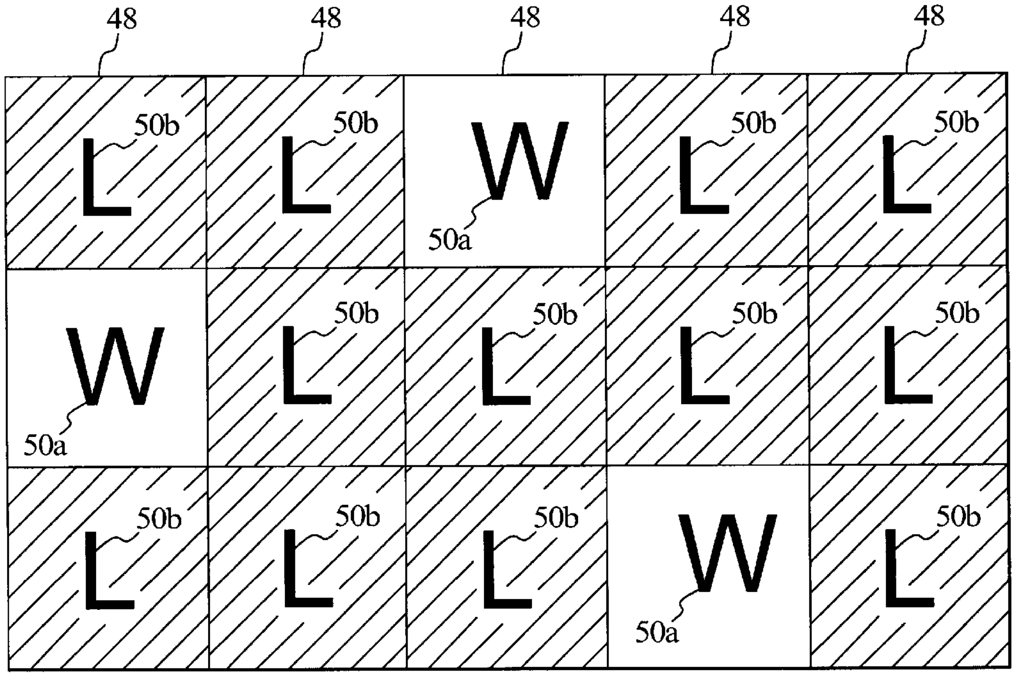
FIG. 5 is a top plan view of the reels, winning symbols and losing symbols in one embodiment of the present invention.

If the player achieves a winning event, the computer signifies the winning symbols. In FIGS. 4 and 5, the winning symbols 50*a* are represented by a "W" and the losing symbols 50*b* are represented by an "L". As illustrated in FIG. 4, the winning symbols 50*a* appear in the middle row. In this case, the winning event could be winning symbols 50*a* appearing in the middle row of all of the reels or any predetermined number of winning symbols 50*a* being located in the middle row.

As also shown in FIG. 4, the computer applied an enhancement to all of the losing symbols 50*b*. Preferably the enhancement is a coloration or darkening of the backgrounds of the losing symbols 50*b*. As further shown in FIG. 5, winning symbols 50*a* can appear any place on the reels 48, and the computer applies an enhancement to the backgrounds of all losing symbols 50*bs.*

Figure 6:
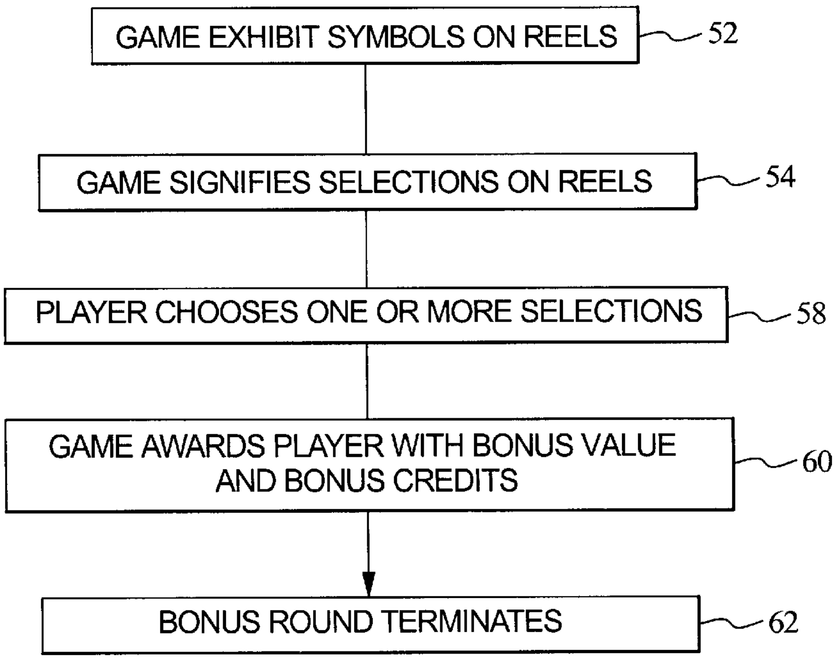
FIG. 6 is a flow diagram of one embodiment of the present invention.
Figure 7:
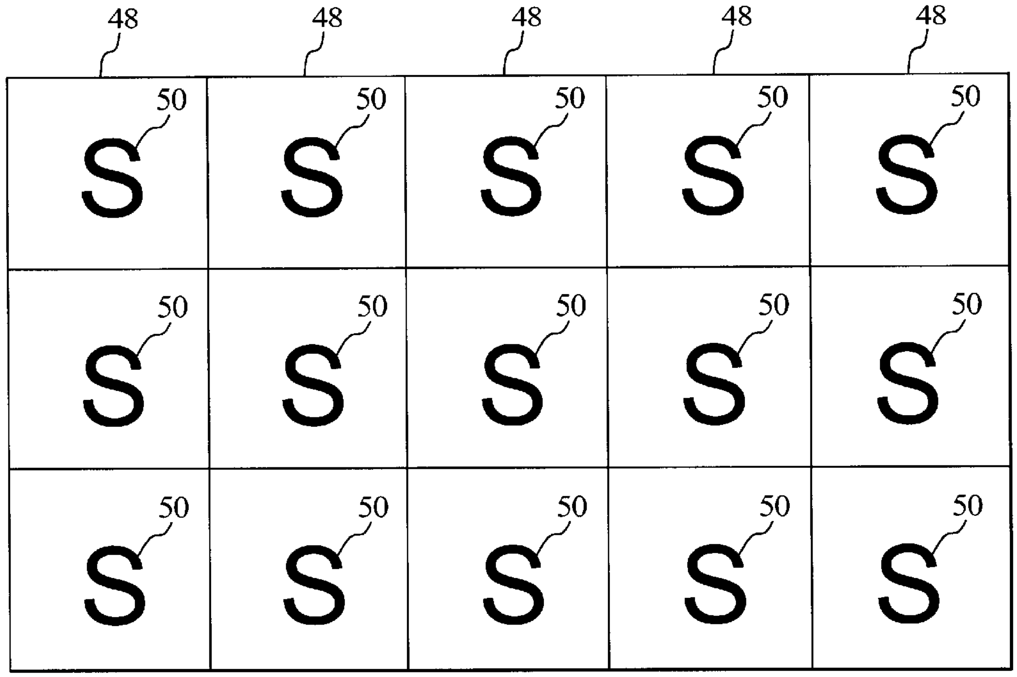
FIG. 7 is a top plan view of the reels and symbols in one embodiment of the present invention.

In another embodiment, if a player achieves a bonus triggering or qualifying condition while playing the primary game, the reels 48 become stationary, and the gaming device 10 exhibits certain predetermined symbols 50 on reels 48, as indicated by block 52 in FIG. 6. Reels 48 and symbols 50 are illustrated in the example bonus round shown in FIGS. 7 and 8 where reels 48 are shown as columns of letters. Again, the letter "S" represents the symbols 50. After exhibiting these symbols 50, the game signifies certain selections 56 with certain enhancements, as indicated by block 54 in FIG. 6.

Figure 8:
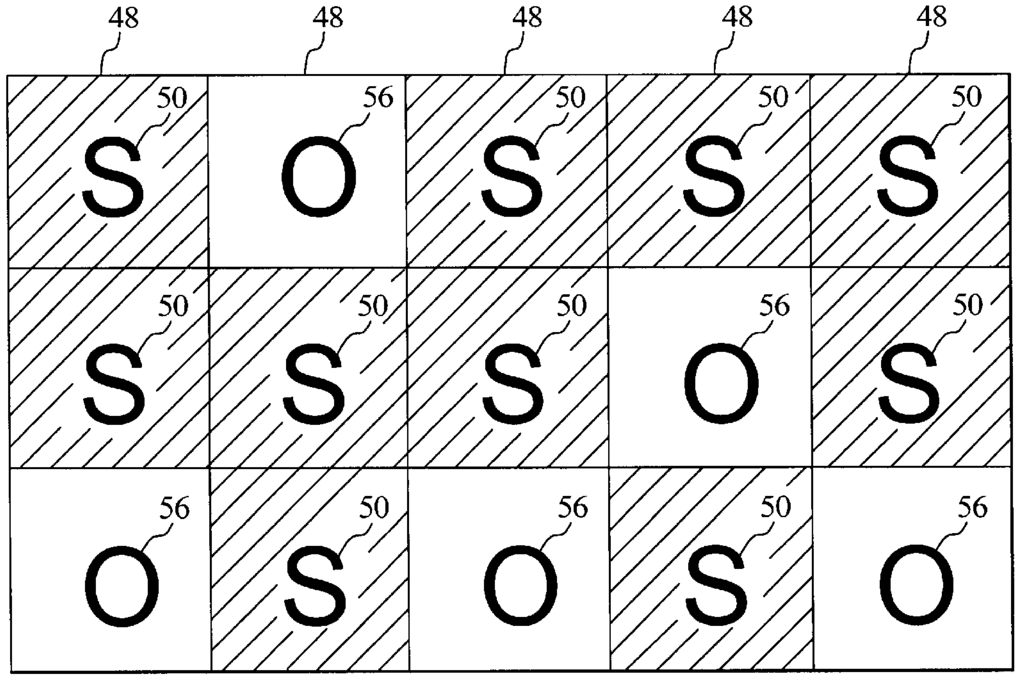
FIG. 8 is a top plan view of the reels, symbols and selections in one embodiment of the present invention.

As illustrated in FIG. 8, preferably, the computer signifies selections 56 by displaying a certain color background for the selections 56 and a different color background for the other symbols 50. The selections 56 are illustrated in FIG. 8 with the letter "O". Here, the computer exhibits selections 56 on a white background and exhibits the other symbols 50 on a gray background.

Figure 9:
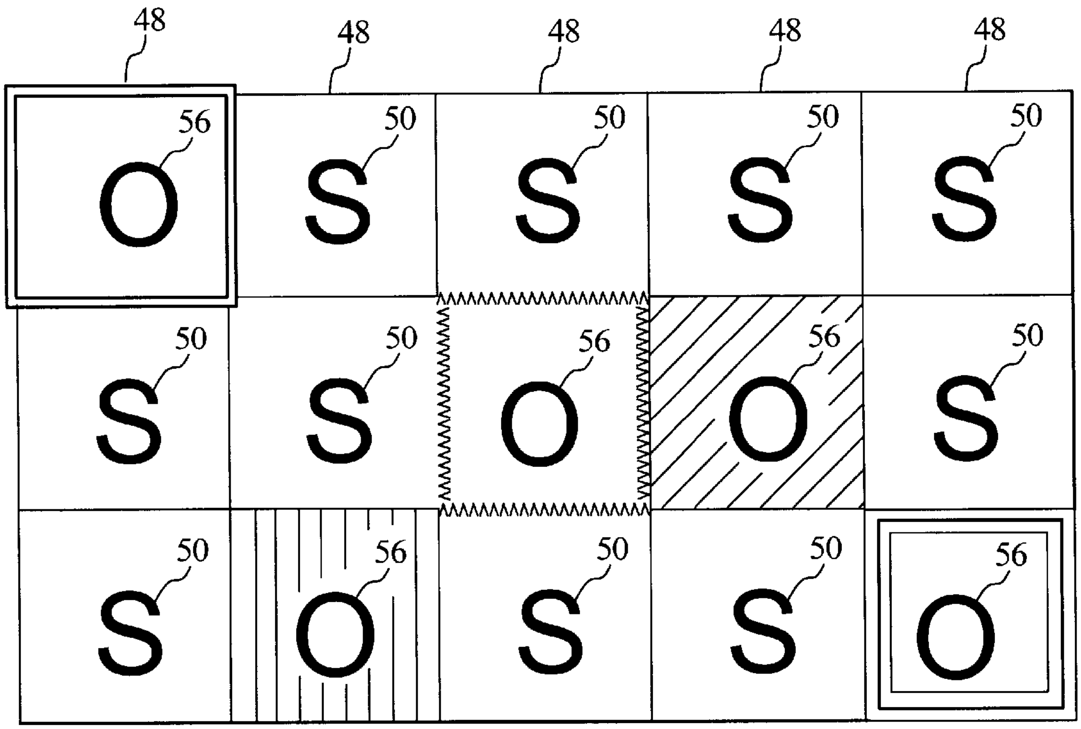
FIG. 9 is a top plan view of the reels, symbols, selections and various enhancements in one embodiment of the present invention.

However, the computer can use any type of enhancement to signify selections 56. Various types of enhancements are illustrated in FIG. 9, merely for illustrative purposes. From left to right, the first reel includes a shaded border enhancement of the selection 56 located in the first row, the second reel includes a pin stripe enhancement of the selection 56 located in the third row, the third reel includes a wavy border enhancement of the selection 56 located in the second row, the fourth reel includes a colored or shaded background enhancement of the selection 56 located in the second row and the fifth reel includes a frame border enhancement of the selection 56 located in the third row. It should be appreciated that the symbol 50 itself could also be changed in accordance with the present invention.

Referring back to FIG. 6, after the game exhibits the selections 56, the game enables the player to choose one or more selections 56, as indicated by block 58 in FIG. 6. In one embodiment, the game enables the player to choose only one selection 56. Furthermore, it is preferable that in order to choose a selection 56, the player touches the display device 34 at the position of selection 56. Preferably, when the player chooses a selection 56, the chosen selection 56 and/or one or more of the other symbols 50 or other selections 56 animate. The reels 48 preferably include various types of selections 56, symbols 50 and animations, preferably related with a common theme.

After the player chooses a selection 56 and after the animation, if any, the game awards the player with bonus value and the corresponding bonus credits, as indicated by block 60 in FIG. 6. Preferably, the bonus value is associated with the chosen selection 56 and is predetermined and programmed into the gaming device computer. In addition, it is preferred that the awarded bonus values vary from selection to selection and that these bonus values are masked. After the game provides this award, the bonus round terminates, as indicated by block 62 in FIG. 6.

Figure 10:
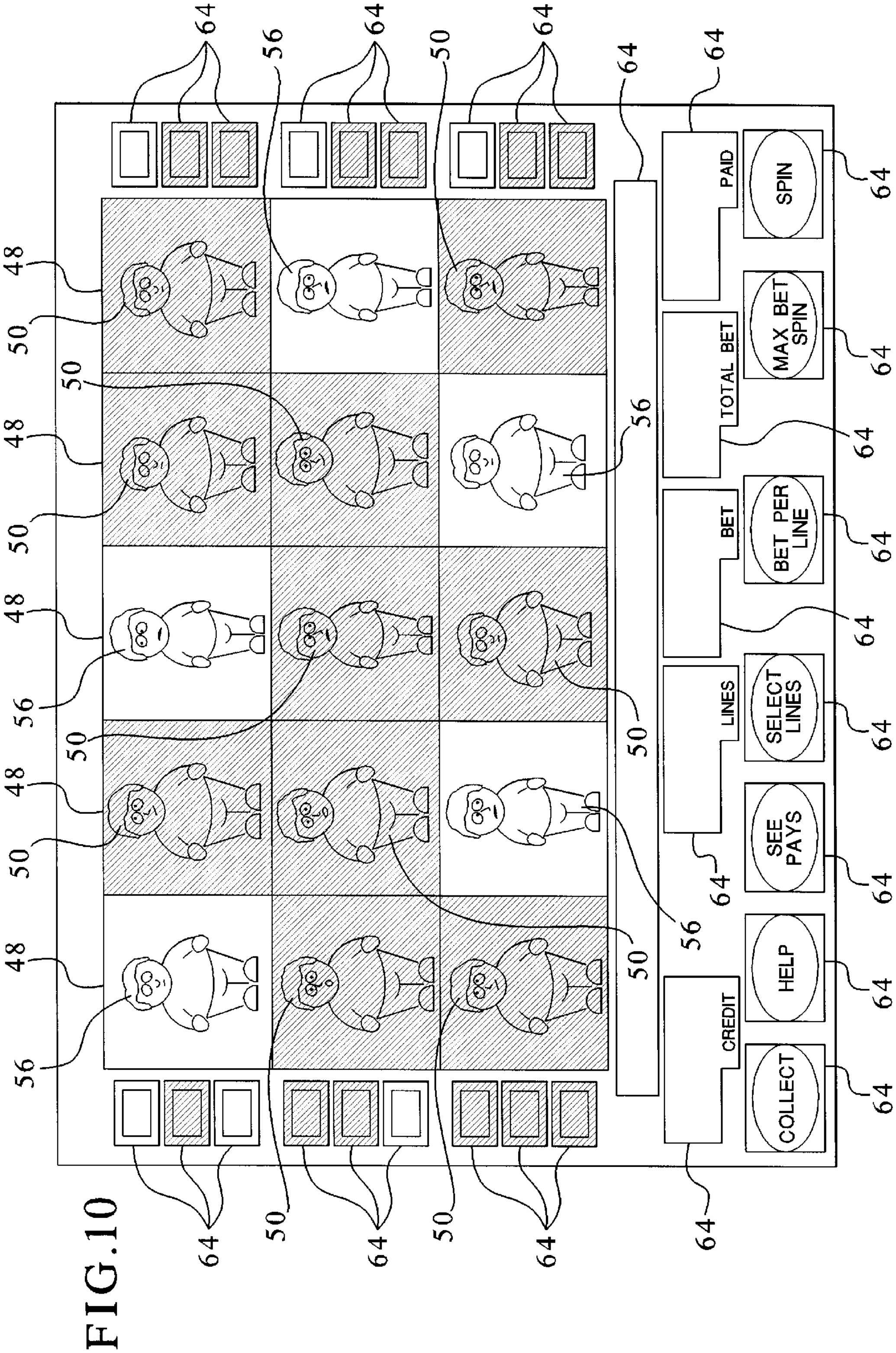
FIG. 10 is a top plan view of reels and other symbols and selections of one embodiment of the present invention.

In one preferred embodiment, the game displays five reels 48, shown in FIG. 10. Each reel exhibits three symbols 50, each including one selection 56. The computer signifies the selections 56 by coloring white the background of the selections 56 and coloring gray the background of the other symbols 50.

As shown in FIG. 10, the symbols 50 include a variety of characters, messages and items. The game enables the player to choose only one selection 56. When the player chooses a selection 56, one or more of the symbols 50 and/or selections 56 animate. In this embodiment, the selections 56 are preferably all characters, and when a player chooses a character selection 56, the chosen character dances, accompanied by certain sounds. In each of these preferred embodiments, the game includes various windows 64 shown in FIG. 10 which allow the player to select certain game options (i.e., bet options), enable the player to operate the game and generally provide information to the player, such as the amount of value and credit the player gained.

The gaming device of the present invention draws a player's attention to certain reel symbols in various circumstances, such as upon the appearance of winning symbols and for symbols which a player can select.

In primary games, the computer enhances the backgrounds of the losing symbols so as to signify the winning symbols. After such enhancement, the game awards the player with predetermined value. In bonus rounds, the computer signifies certain selectable symbols or selections with certain enhancements. The player chooses a selection, and the game awards the player with a bonus value associated with the chosen selection. Preferably, prior to receiving the award, the game entertains the player by animating certain selections and/or symbols for a certain amount of time. In both the primary game and bonus round, the enhancement is preferably coloration or shading. This type of gaming device emphasizes gaming events, directs the player to interact with certain symbols on the reels and increases the player's entertainment and enjoyment.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device having a game, said gaming device comprising:

a plurality of symbols, wherein upon occurrence of a winning combination of said symbols in said game, a plurality of said symbols are winning symbols and at least one of said symbols is a losing symbol, said winning symbols being part of said winning combination of symbols;

means for enhancing the losing symbols upon occurrence of said winning combination of symbols;

a display device for displaying the symbols and the losing symbol enhancing means;

means for enabling a player to select at least one of said winning symbols after the occurrence of said winning combination of symbols and after said display device displays the losing symbol enhancing means; and a plurality of awards associated with said winning symbols, said award associated with the winning symbol selected by the player being provided to the player.

2. The gaming device of claim 1, wherein the means for enhancing the losing symbols includes means for enhancing a background around the losing symbols.

3. The gaming device of claim 1, wherein the losing symbol enhancing means includes darkening of at least part of the losing symbols.

4. The gaming device of claim 1, which includes a plurality of losing symbols upon the occurrence of said winning combination of symbols.

5. The gaming device of claim 1, which includes means for enhancing the winning symbols upon occurrence of said winning combination of symbols, wherein said display device displays said winning symbol enhancing means.

6. The gaming device of claim 1, wherein the symbols are cards.

7. A gaming device including a game, said gaming device comprising:

a plurality of symbols, said symbols including a plurality of player selectable symbols and at least one non-selectable symbol upon the occurrence of a predetermined combination of symbols in said game;

means for signifying the player selectable symbols upon the occurrence of said predetermined combination of symbols;

a display device for displaying the symbols, the predetermined combination of symbols, the player selectable symbols, the non-selectable symbols and the player selectable symbol signifying means; and a processor which communicates with said display device, whereupon occurrence of said predetermined combination of symbols, said processor causes the display device to signify the player selectable symbols using the signifying means.

8. The gaming device of claim 7, wherein the means for signifying the player selectable symbols includes means for enhancing the non-selectable symbols.

9. The gaming device of claim 8, wherein the means for enhancing the non-selectable symbols includes means for enhancing a background around the non-selectable symbols.

10. The gaming device of claim 7, which includes a plurality of non-selectable symbols upon the occurrence of said predetermined combination of symbols, and upon the occurrence of said predetermined combination of symbols said non-selectable symbols are enhanced by the non-selectable symbol enhancing means.

11. The gaming device of claim 10, wherein the means for signifying the selectable symbols includes means for enhancing a background around each of the non-selectable symbols.

12. The gaming device of claim 7, wherein the means for signifying the player selectable symbols includes means for enhancing the player selectable symbols.

13. The gaming device of claim 7, wherein the means for signifying the player selectable symbols includes means for enhancing a background around the player selectable symbols.

14. The gaming device of claim 7, wherein the display device includes a touch screen for enabling a player to select the player selectable symbols and for communicating said selections to the processor.

15. The gaming device of claim 7, which includes an award associated with each player selectable symbol which is provided to a player when the player selects said player selectable symbol.

16. The gaming device of claim 15, wherein the awards associated with each player selectable symbol include bonus credits.

17. The gaming device of claim 7, wherein the symbols are cards.

18. A gaming device including a game, said gaming device comprising:

a plurality of symbols, whereupon an occurrence of at least one predetermined combination of said symbols, a plurality of said symbols are selectable symbols and at least one of said symbols is a non-selectable symbol;

a display device for displaying the symbols including the selectable symbols and the non-selectable symbols, and for distinguishing the selectable symbols from the non-selectable symbols upon the occurrence of said pre-determined combination of said symbols;

a plurality of awards associated with the distinguished selectable symbols;

a selector for enabling a player to select at least one of the distinguished selectable symbols; and a processor for communicating with the display device, the selector and for providing the player the award associated with the selectable symbol selected by the player.

19. The gaming device of claim 18, wherein the display device distinguishes the selectable and non-selectable symbols by changing the appearance of the non-selectable symbols.

20. The gaming device of claim 19, wherein the appearance of the non-selectable symbols includes a faded background.

21. The gaming device of claim 18, wherein the selector includes a touch screen connected to the display device.

22. The gaming device of claim 18, wherein the symbols are cards.

23. A gaming device having a game, said gaming device comprising:

a plurality of symbols in said game, wherein upon an occurrence of at least one predetermined combination of said symbols, a plurality of said symbols are selectable symbols and at least one of said symbols is a non-selectable symbol;

a display device for displaying the symbols including the selectable symbols and the non-selectable symbols, and for distinguishing the selectable symbols from the non-selectable symbols upon the occurrence of said pre-determined combination of said symbols;

a plurality of awards associated with the distinguished selectable symbols; and a processor for communicating with the display device, selecting at least one of the selectable symbols upon the occurrence of the predetermined combination, and for providing the player the award associated with the selected selectable symbol.

24. The gaming device of claim 23, wherein the display device distinguishes the selectable and non-selectable symbols by changing the appearance of the non-selectable symbols.

25. The gaming device of claim 24, wherein the appearance of the non-selectable symbols includes a faded background.

26. The gaming device of claim 23, wherein the symbols are cards.

27. A method for operating a gaming device, said method comprising the steps of:

(a) randomly selecting a plurality of symbols provided in a game;

(b) determining a predetermined combination of said symbols;

(c) providing a plurality of player selectable symbols and at least one non-selectable symbol on a plurality of reels if said predetermined combination of symbols appears, wherein said player selectable symbols are the symbols in said predetermined combination of symbols;

(d) signifying the player selectable symbols;

(e) enabling a player to select at least one of the signified player selectable symbols; and (f) providing the player an award associated with the player selectable symbol selected by the player.

28. The method of claim 27, wherein the step of signifying the player selectable symbols includes enhancing the non-selectable symbols.

29. The method of claim 28, which includes providing a plurality of non-selectable symbols.

30. The method of claim 28, which includes repeating steps (e) and (f) at least once.

31. The method of claim 27, wherein the symbols are cards.

* * * * *

UNITED STATES PATENT AND TRADEMARK OFFICE

CERTIFICATE OF CORRECTION

PATENT NO. : 6,558,254 B2 
DATED : May 6, 2003
INVENTOR(S) : Baerlocher et al.

It is certified that error appears in the above-identified patent and that said Letters Patent is hereby corrected as shown below:

Title page,
Item [75], Inventors: change, "Anthony J. Baelocher" to -- Anthony J. Baerlocher --.
Item [12], Heading: change, "Baelocher, et al." to -- Baerlocher, et al. --.

Drawings,
Fig. 6, change "GAME EXHIBIT" to -- GAME EXHIBITS --.

Column 2,
Line 24, change "the term exhibit" to -- the term exhibits --.

Column 3,
Line 49, change "corresponds the chosen" to -- corresponds to the chosen --.

Column 6,
Line 44, change "losing symbols 50bs" to -- losing symbols 50b --.

Column 7,
Lines 23-24, change "with bonus value" to -- with a bonus value --.
Line 54, change "with predetermined value" to -- with a predetermined value --.

Column 8,
Line 46, change "upon occurrence" to -- upon the occurrence --.
Line 67, change "whereupon occurrence" to -- whereupon the occurrence --.

Column 9,
Line 57, change "display device, the selector" to -- display device and the selector --.

Signed and Sealed this

Twenty-sixth Day of August, 2003

JAMES E. ROGAN
*Director of the United States Patent and Trademark Office*